US009628008B1

(12) United States Patent
Fedders et al.

(10) Patent No.: US 9,628,008 B1
(45) Date of Patent: Apr. 18, 2017

(54) METHOD AND GENERATOR CONTROL UNIT FOR CONFIGURING AN OUTPUT FROM A GENERATOR

(71) Applicant: GE Aviation Systems LLC, Grand Rapids, MI (US)

(72) Inventors: Brandon Joseph Fedders, Washington Township, OH (US); David Dimitri Karipides, Casstown, OH (US); Slobodan Gataric, Xenia, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/007,541

(22) Filed: Jan. 27, 2016

(51) Int. Cl.
*H02P 11/00* (2006.01)
*H02H 7/06* (2006.01)
*H02P 9/00* (2006.01)
*H02P 9/02* (2006.01)
*H02K 11/00* (2016.01)
*H02P 9/14* (2006.01)
*H02P 9/46* (2006.01)

(52) U.S. Cl.
CPC ............ *H02P 9/02* (2013.01); *H02K 11/0094* (2013.01)

(58) Field of Classification Search
USPC .................................. 322/28, 29, 46, 47, 90
See application file for complete search history.

(56) References Cited

U.S. PATENT DOCUMENTS

| 3,571,657 | A | * | 3/1971 | Domann | ............... | H02J 7/1461 |
| | | | | | | 322/28 |
| 4,684,873 | A | | 8/1987 | Glennon | | |
| 4,968,926 | A | * | 11/1990 | Dhyanchand | ........... | H02M 5/48 |
| | | | | | | 290/38 R |
| 5,233,286 | A | | 8/1993 | Rozman et al. | | |
| 5,852,558 | A | * | 12/1998 | Julian | ................. | H02M 7/5387 |
| | | | | | | 363/132 |
| 6,844,707 | B1 | | 1/2005 | Raad | | |
| 7,920,393 | B2 | * | 4/2011 | Bendre | ................. | H02M 7/487 |
| | | | | | | 363/127 |
| 8,358,111 | B2 | * | 1/2013 | Rozman | ................. | H02K 19/34 |
| | | | | | | 322/10 |
| 2008/0298103 | A1 | * | 12/2008 | Bendre | ................. | H02M 7/487 |
| | | | | | | 363/89 |

* cited by examiner

*Primary Examiner* — Pedro J Cuevas
(74) *Attorney, Agent, or Firm* — GE Global Patent Operation; William S. Munnerlyn

(57) ABSTRACT

A method and apparatus for operating a generator control unit having power bridge, further including having an input and at least one output, wherein the input is operably coupled with a generator power output, and a controller communicatively coupled with the power bridge and configured to operate the power bridge.

20 Claims, 5 Drawing Sheets

METHOD AND GENERATOR CONTROL UNIT FOR CONFIGURING AN OUTPUT FROM A GENERATOR

BACKGROUND OF THE INVENTION

Electric machines, such as electric motors and/or electric generators, are used in energy conversion. In the aircraft industry, it is common to find an electric motor having a combination of motor and generator modes, where the electric machine, in motor mode, is used to start an aircraft engine, and, depending on the mode, also functions as a generator to supply electrical power to aircraft systems. Regardless of the mode, the machines typically include a rotor having main windings that are driven to rotate by a source of rotation, such as a mechanical or electrical machine, which for some aircraft can be a gas turbine engine.

Electric machines can further include a generator control unit, which, for example, controls the generator operation to provide or stabilize voltage regulation, current limits, reverse current protection, overvoltage protection, ground fault protection, or a combination thereof. One generator control unit is typically included for one electrical machine.

BRIEF DESCRIPTION OF THE INVENTION

In one aspect, a generator control unit includes a four-leg power bridge having an input, three output phases, and a neutral phase output, wherein the input is operably coupled with a generator direct current (DC) power output and the four-leg power bridge includes a first selectively enablable switchable element having an alternating current (AC) position that electrically de-couples the three output phases and a DC position that electrically couples the three output phases, and a controller communicatively coupled with the four-leg power bridge and configured to operate the four-leg power bridge as at least one of a DC-to-DC power converter or a DC-to-AC power inverter. The generator control unit is selectably operable in an AC operating mode when the first selectively enablable switchable element is in the AC position and the controller operably controls the four-leg power bridge as a DC-to-AC power inverter, and operable in a DC operating mode when the first selectively enablable switchable element is in the DC position and the controller operably controls the four-leg power bridge as a DC-to-DC power converter.

In another aspect, a generator includes a rotatable rotor having a first set of windings, a stator having a second set of windings electrically coupled with an output, wherein rotation of the first set of windings relative to the second set of windings supplies a direct current power at the output, and a generator control unit. The generator control unit includes a four-leg power bridge having an input, three output phases, and a neutral phase output, wherein the input is operably coupled with the second set of windings and the four-leg power bridge includes a first selectable connector having an AC position that does not jump the three output phases and a DC position that jumps the three output phases, and a controller communicatively coupled with the four-leg power bridge and configured to operate the four-leg power bridge as at least one of a DC-to-DC power converter or a DC-to-AC power inverter. The generator is selectably operable in an AC operating mode when the first selectable connector is in the AC position and the controller operably controls the four-leg power bridge as a DC-to-AC power inverter, and operable in a DC operating mode when the first selectable connector is in the DC position and the controller operably controls the four-leg power bridge as a DC-to-DC power converter.

In yet another aspect, a method of configuring output from a generator, includes determining output from a generator as one of alternating current (AC) power or direct current (DC) power, and connecting a generator control unit to the generator, the generator control unit having a four-leg power bridge including three output phases and a neutral phase output, and a controller module configured to operate the four-leg power bridge as a DC-to-AC power inverter or as a DC-to-DC-power converter. In response to determining the output from the generator as DC power, setting the generator control unit to operate in a DC generating mode by connecting a first jumper connector to the four-leg power bridge in a DC position that operably jumps the three output phases, and setting the controller module to operate the four-leg power bridge as a DC-to-DC power converter. In response to determining the output from the generator as AC power, setting the generator control unit to operate in an AC generating mode by withholding the first jumper connector from the four-leg power bridge in an AC position that does not operably jump the three output phases, and setting the controller module to operate the four-leg power bridge as a DC-to-AC power inverter.

DESCRIPTION OF EMBODIMENTS OF THE INVENTION

Figure 1:
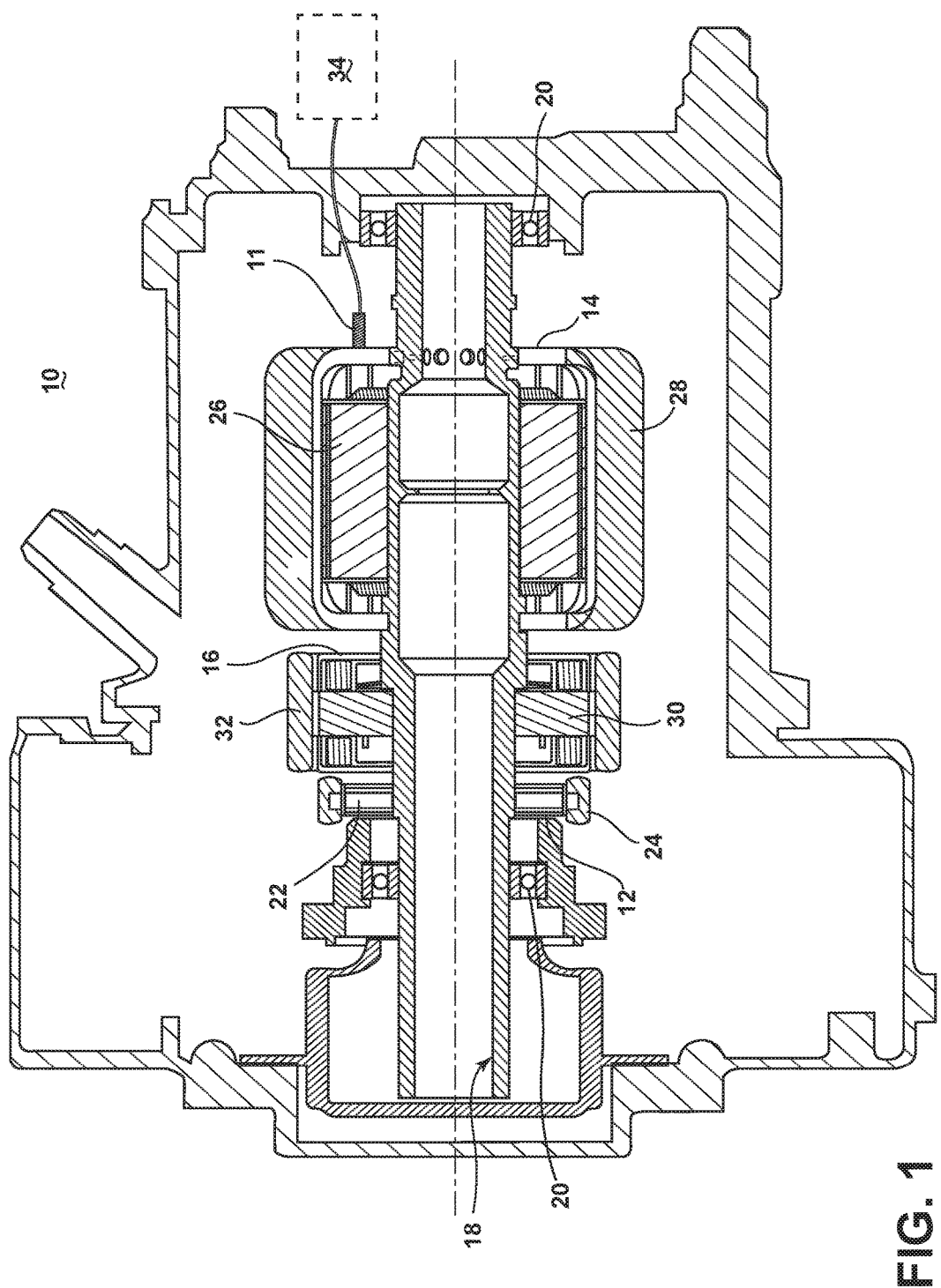
FIG. 1 is a sectional view of a starter/generator assembly, in accordance with various aspects described herein.

While the invention can be implemented in any environment using a synchronous electric motor, it is current contemplated to be implemented in a jet engine environment, where the electric motor is typically referred to as a machine, an example of which is a generator or a starter/generator (S/G). Thus, a brief summary of the contemplated environment should aid in a more complete understanding. FIG. 1 schematically illustrates an S/G assembly 10 mounted on or within a gas turbine aircraft engine. The gas turbine engine can be a turbofan engine, such as a General Electric GEnx or CF6 series engine, commonly used in modern commercial and military aviation or it could be a variety of other known gas turbine engines such as a turboprop or turboshaft. The S/G assembly 10 can be mounted on the outside of either the air intake region of the gas turbine engine containing the fan or on the core near the high pressure compression region. At least one voltage output is provided on an exterior of the S/G assembly 10 to provide for transfer of electrical power to and from the S/G assembly 10 to a set of electrical loads 34. This power connection, as illustrated, can be transmitted by an electrical power cable 11.

The S/G assembly 10 comprises a rotatable shaft 18, a synchronous main machine 14, an exciter 16, and a permanent magnet generator (PMG) 12. The rotatable shaft 18 is supported by spaced bearings 20. Each of the PMG 12, main machine 14, and exciter 16 have a rotor 22, 26, 30, respectively, and a corresponding stator 24, 28, 32, respectively. The rotors 22, 26, 30 are mounted to the rotatable shaft 18 for rotation relative to the stators 24, 28, 32, which are rotationally fixed within the S/G assembly 10. The stators 24, 28, 32 can be mounted to any suitable part of housing portion of the S/G assembly 10.

In the illustrated embodiment, the main machine 14 is located in a rear of the S/G assembly 10 and the PMG 12 is positioned in a front of the S/G assembly 10. The exciter 16 is positioned in the S/G assembly 10 between the main machine 14 and the PMG 12. The illustrated embodiment is one non-limiting example configuration of embodiments of the disclosure, and other positions of the main machine 14, PMG 12, and exciter 16 can be included. Additionally, while a starter/generator assembly 10 is shown, embodiments of the disclosure can be equally applicable in a generator without starting capabilities. While the S/G assembly 10 is described embodiments of the disclosure can be applied with any power generating assembly.

Figure 2:
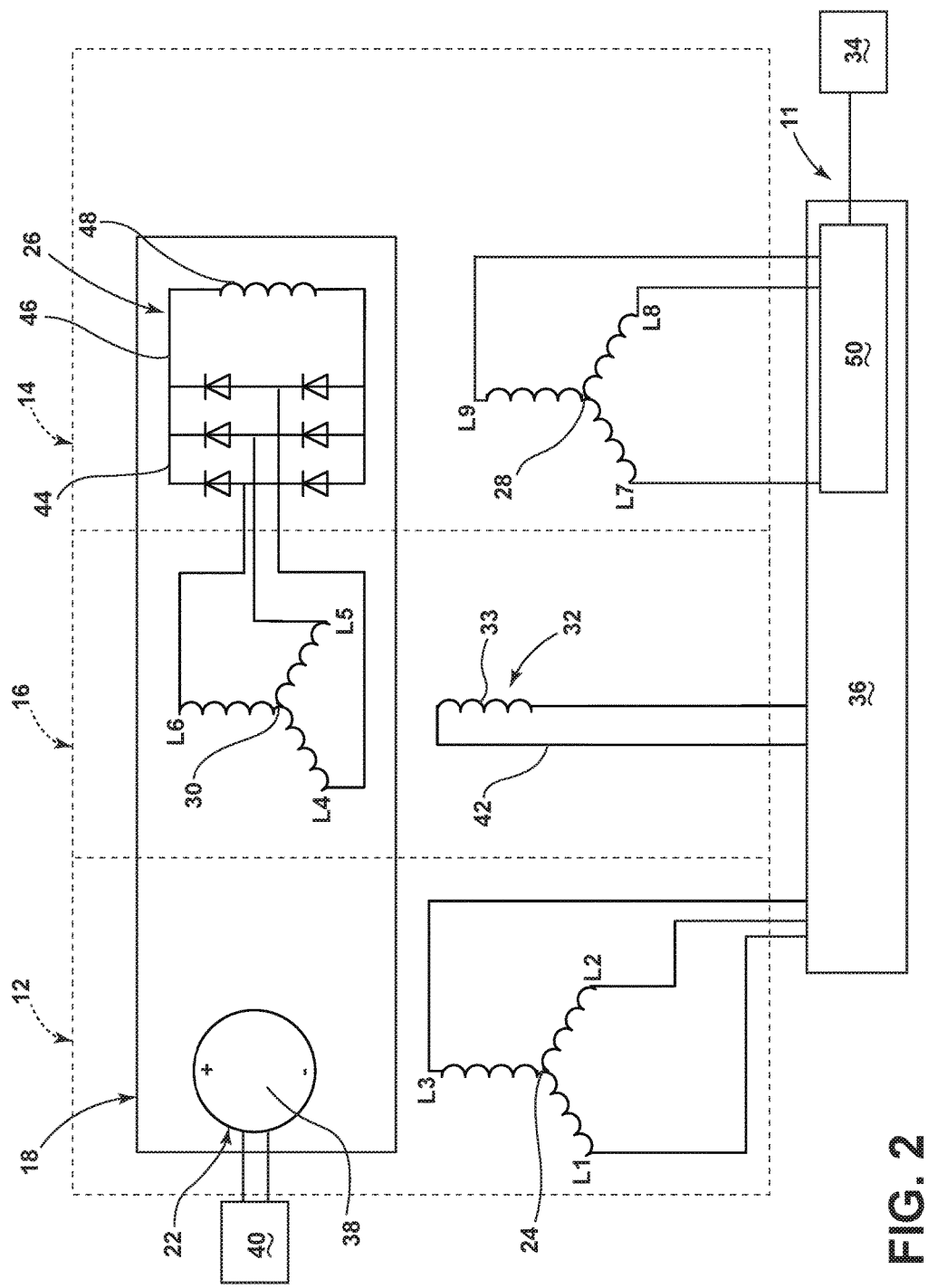
FIG. 2 is a schematic view of a starter/generator assembly, in accordance with various aspects described herein.

FIG. 2 illustrates a schematic view of the S/G assembly 10 of FIG. 1, wherein the rotors 22, 26, 30 are rotatably mounted with the rotatable shaft 18, and wherein the shaft 18 is rotationally coupled with a source of rotation, such as via a rotating spool 40 of the gas turbine engine. The S/G assembly 10 can also include a generator control unit (GCU) 36, which can further include a converter 50 for converting a first power to a second power. While a rotating spool 40 of a gas turbine engine is described, embodiments of the disclosure can be equally applied to any source of rotation. Additional sources of rotation for a generator can include an internal combustion engine, hydraulically-powered rotation, wind-driven rotation, and the like. Additionally, while not illustrated, the coupling of the rotatable shaft 18 with the spool 40 of the gas turbine engine can include a gearbox for controlling the rotational shaft 18 relative to the rotational speed of the spool 40. Additional non-limiting examples of mechanisms for coupling the rotatable shaft 18 with the spool 40 of the gas turbine engine can include a continuously variable transmission or a hydrostatic transmission.

The PMG rotor 22 can include a permanent magnet 38 with at least two poles and the PMG stator 24 can include a set of windings arranged to provide for an output. For example, an alternating three phase output can be provided along leads L1, L2, L3 which are supplied to the exciter stator 32, via the GCU 36. The exciter stator 32 can include a set of exciter stator windings 33 coupled to the output lead 42 of the GCU 36.

The exciter rotor 30 can include a set of windings arranged to provide for an alternating three phase output along leads L4, L5, L6 which, as illustrated, can be supplied to a rectifier 44 for rectifying the alternating three phase output to a direct current (DC) output. The rectifier 44 can further supply the rectified DC output to a common supply line 46 electrically coupled with a set of rotor windings 48 of the main machine rotor 26.

The main machine stator 28 has a set of stator windings, shown as leads L7, L8, L9, configured to provide an alternating three phase output to the converter 50 of the GCU 36, for converting the first power provided by the main machine stator 28 to a second power. The converter 50, for example, can be configured to convert DC to alternating current (AC), to convert a first voltage to a second voltage, to convert a first alternating frequency to a second alternating frequency, or any combination thereof. The converter 50 further provides the converted second power to a power-consuming load, such as the set of electrical loads 34. While the GCU 36 has been schematically illustrated removed from either the rotors 22, 26, 30 or stators 24, 28, 32, embodiments of the disclosure can include a GCU 36 fixedly or removably mounted with the S/G assembly 10.

Figure 3:
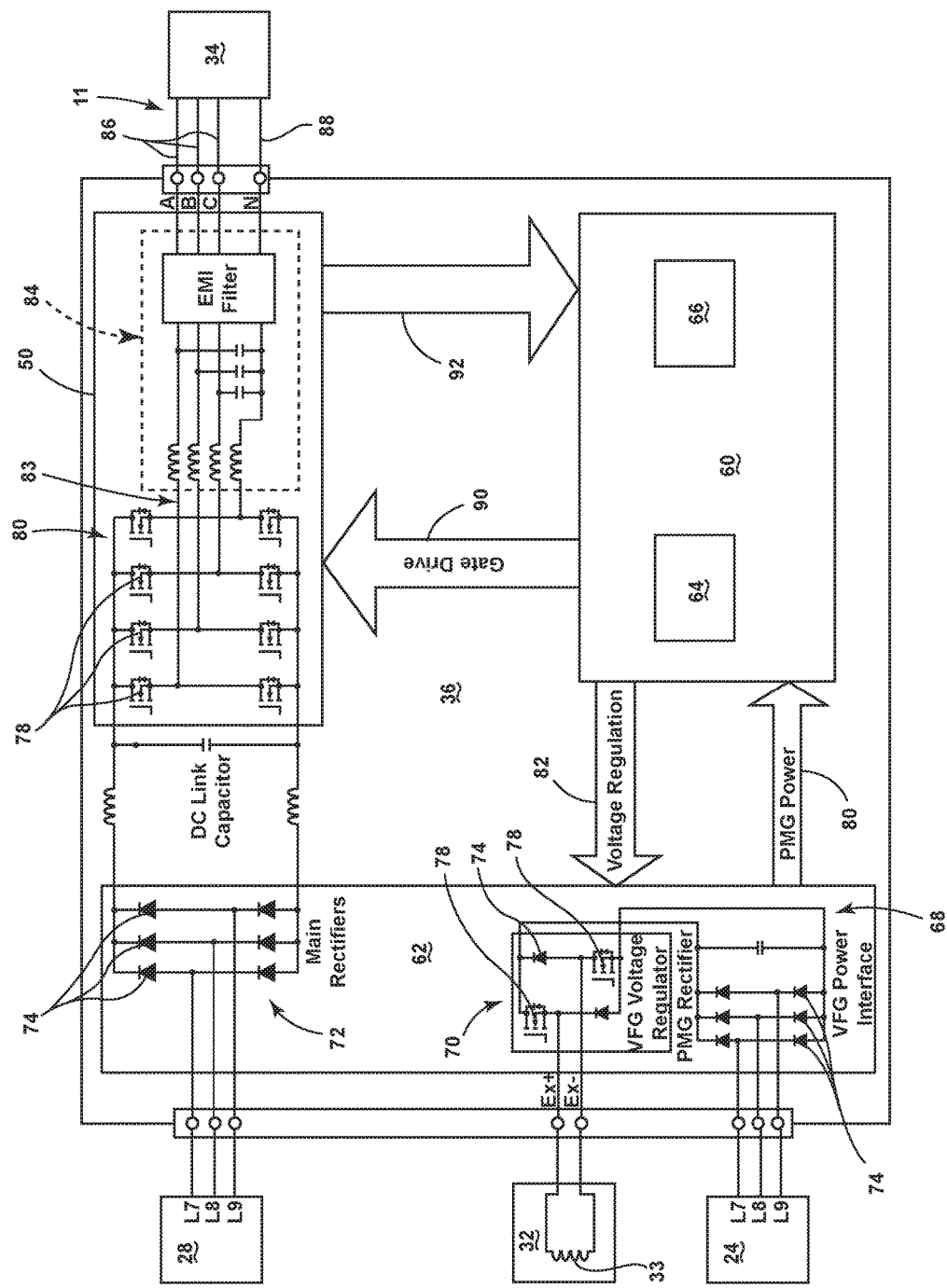
FIG. 3 is a schematic view of the generator control unit of the starter/generator assembly, in accordance with various aspects described herein.

FIG. 3 illustrates a schematic view of a first embodiment of the GCU 36 and converter 50, according to the disclosure. The GCU 36 can include a control controller module 60, a power interface 62, and the converter 50. The controller module 60 can further include a processor 64 and memory 66. The power interface 62 can further include a PMG rectifier 68, a controllable exciter voltage regulator 70, and a main machine output rectifier 72.

The PMG rectifier 68 can include a rectifying bridge, illustrated as a full bridge configuration of diodes 74, however, embodiments of the rectifier 68 can include half-bridge rectifying configurations as well. The PMG rectifier 68 can be electrically coupled with the electrical output of the PMG stator 24, such that the rectifier 68 operably receives the stator 24 outputs L1, L2, and L3, and rectifies the three phase stator 24 output to a DC voltage. The rectified DC voltage can further be supplied to the exciter voltage regulator 70. In the non-limiting example embodiment of the PMG rectifier 68 shown, the rectifier can include a DC voltage filtering or smoothing element 76, such as a capacitor, to regulate, even, smooth, or filter the rectified DC voltage output of the diodes 74. Additional optional filtering or smoothing elements 76 can be included.

The controllable exciter voltage regulator 70 can include a set of controllable switching elements, such as a transistors 78 electrically in series with a diode 74. As shown, a set of a transistor 78/diode 74 pair can be configured electrically in parallel with another set of a transistor 78/diode 74 pair. The controllable switching elements can be electrically arranged to receive the rectified DC voltage from the PMG rectifier 68, and in response to a control signal, operate the switching elements to deliver an exciter signal to the exciter stator windings 33 to electrically "lead" the rotational frequency of the rotatable shaft 18 to a steady-state operating frequency for the S/G assembly 10. The exciter signal can also be configured such that the rotation of the exciter rotor 30 relative to the exciter stator windings 33 generates power in the rotor 30. Stated another way, the exciter voltage regulator 70 operably delivers power to the exciter stator windings 33, which in turn generates or induces current in the exciter rotor 30, which rotates relative to the exciter stator windings 33.

The main machine output rectifier 72 can include a rectifying bridge, illustrated as a full bridge configuration of diodes 74, however, embodiments of the rectifier 68 can include half-bridge rectifying configurations as well. The main machine output rectifier 72 can be electrically coupled with the main machine stator 28 output leads L7, L8, and L9, and can operate to rectify the three phase stator 28 output to a DC voltage. While the diodes 74 and transistors 78 have been illustrated as similar components, embodiments of the disclosure can include configurations wherein, for example, a first set of diodes 74 or rectifying bridge can be utilized in the PMG rectifier 68 while a second set of diodes 74 or rectifying bridge can be utilized in the exciter voltage regulator 70 or main machine output rectifier 72.

Turning now to the controller module 60, the memory 66 can store a set of operational control profiles or programs for operating the power interface 62, the converter 50, and the overall S/G assembly 10. The memory 66 can include random access memory (RAM), read-only memory (ROM), flash memory, or one or more different types of portable electronic memory, such as discs, DVDs, CD-ROMs, etc., or any suitable combination of these types of memory. The controller module 60 can be operably coupled with the memory 66 such that one of the controller module 60 and the memory 66 can include all or a portion of a computer program having an executable instruction set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, controller module 60, or special purpose processing machine to perform a certain function or group of functions. In implementation, the functions can be converted to a computer program comprising a set of executable instructions, which can be executed by the processor 64.

The converter 50 can include a transistor bridge 80 having a set of controllable transistors 78 electrically connected with the output of the main machine output rectifier 72 and arranged to provide for a set of voltage outputs 83. The set of voltage outputs 83 can further be electrically connected with a set of filtering elements 84, which, for example, can include capacitors, inductors, an electromagnetic interference filter, chokes, transformers, or a combination thereof. As schematically illustrated, the controllable transistor bridge 80 can be arranged to provide a four-leg or four-phase set of voltage outputs 83, for instance, including three phases of AC power 86 and a neutral leg 88. The four-leg outputs are electrically coupled through the set of filtering elements 84, and can further be provided to the set of electrical loads 34.

The converter 50 or the transistor bridge 80 can be communicatively coupled with the controller module 60 or the processor 64 and can be controlled in response to receiving a first gate drive signal 90 provided by the controller module 60 or the processor 64. The converter 50 or the transistor bridge 80 can operate in response to the first gate drive signal 90 to convert a first power, such as the power received at the output of the main machine output rectifier 72, to a second power, such as a four-leg AC voltage output. The aforementioned second power can be configured or selected based on the desired operating power of the set of electrical loads. One non-limiting example second power can include 115 Volts AC at 400 Hz. The converter 50 can optionally provide a second signal 92 to the controller module 60 or processor 64 indicative of the converting, the current output, the voltage output, or the like.

By way of a non-limiting example, the processor 64 or the controller module 60 can also be configured to monitor the power generated by the rotation of the PMG rotor 22 relative to the PMG stator 24 and power supplied to the PMG rectifier 68. The monitoring of the power generation is represented by a PMG power signal 80. The processor 64 or controller module 60 can further be configured to provide an exciter voltage regulator control signal 82 to the exciter voltage regulator 70, wherein, for example, the control signal 82 is configured to controllably operate the set of transistors 78 to generate, induce, drive, or lead the exciter rotor 30 via the exciter stator windings 33. The generating, inducing, driving, or leading of the exciter stator windings 33 by the processor 64 or controller module 60 can operate to further control the phase, voltage, current, or power provided by exciter voltage regulator 70.

As used herein, the monitoring of the power generated by the controller module 60 by way of receiving the PMG power signal 80. In this sense, the PMG power signal 80 is indicative of at least one of the power generated by the rotation of the PMG rotor 22 or the power supplied to the PMG rectifier 68. Embodiments of the disclosure can include measuring, sensing, calculating, or estimating the at least one of the power generated by the rotation of the PMG rotor 22 or the power supplied to the PMG rectifier 68 by a set of sensors. Alternatively, the controller module 60 or the processor 64 can include configured to determine, calculate, or estimate a set of values or parameters related to power generated by the rotation of the PMG rotor 22 or the power supplied to the PMG rectifier 68. Thus, direct sensing or measuring of the aforementioned powers can be optional.

By another way of non-limiting example, the processor 64 or controller module 60 can also be configured to drive, control, or generate the first gate signal 90 for the transistor bridge 80 of the converter 50 to convert the DC power received at the output of the main machine output rectifier 72 to a four-leg output having three phase AC power 86 and a neutral leg 88. For example, the processor 64 or controller module 60 can operate a sine wave modulation profile or program, or a space vector modulation profile or program, such that the switching of the transistor bridge 80 provides the desired four-leg output to the set of electrical loads 34.

During electricity-generating operation of the S/G assembly 10, the rotatable shaft 18 and the rotors 22, 26, 30 are driven by the source of rotation, such as the spool 40, such that they rotate relative to the respective stators 24, 28, 32. The rotating PMG rotor 22 generates a three phase output in the leads L1, L2, L3 of the PMG stator 24, supplying power the GCU 36. The GCU 36 rectifies the three phase output of the PMG stator 24 via the PMG rectifier 68, and provides excitation of the exciter stator windings 33 by way of the exciter voltage regulator 70 and the voltage regulator control signal 82. The exciter stator windings 33, in turn, continue to lead or drive the rotational frequency of the rotatable shaft 18 to the steady-state operating frequency.

The steady-state rotation of the exciter rotor 30 generates a three phase power at the leads L4, L5, L6, which is converted to DC power by the rectifier 44. The DC power is supplied to the main machine rotor 26, rotating relative to the main machine stator 28, generating three phase power output at leads L7, L8, L9. The three phase power from leads L7, L8, and L9 is rectified by the main machine output rectifier 72 of the power interface 62 to DC power, and supplied to the transistor bridge 80 of the converter 50. As explained above, the switching of the transistor bridge 80 is controlled by the first gate drive signal 90 provided by the controller module 60 or the processor 64, and operates the bridge 80 to convert the DC power to a four-leg output having three phase AC power 86 and a neutral leg 88. The three phase AC power 86 and neutral leg 88 can be optionally filtered by the set of filtering elements 84, and provided to the set of electrical loads 34 of the aircraft.

Figure 4:
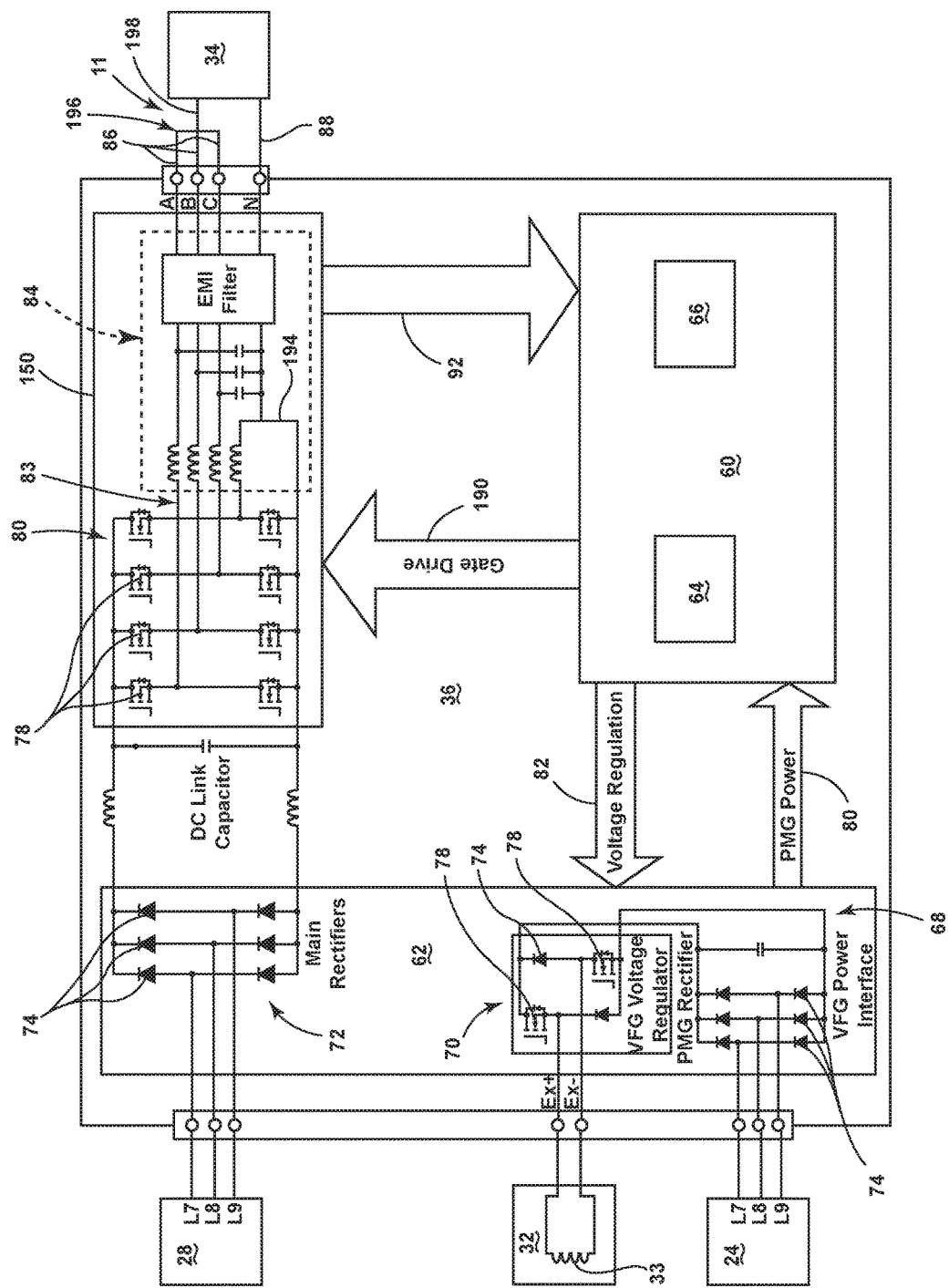
FIG. 4 is an alternative schematic view of the generator control unit of the starter/generator assembly, in accordance with various aspects described herein.

FIG. 4 illustrates a schematic view of a second embodiment of the converter 150 for the GCU 36 of the first embodiment, according to the disclosure. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the second embodiment includes a first electrical connector 194 configured to electrically connect the neutral leg 88 of the converter 150 with the low voltage side of the main machine output rectifier 72. Another difference between the first embodiment and the second embodiment is that the second embodiment also includes a second electrical connector 196 configured to electrically couple the set of three phase power legs 86 of the converter 150 to a common voltage output 198, which is provided to the set of electrical loads 34. The second embodiment thus provides an electrical configuration wherein the converter 150 is configured to provide a single common voltage output 198, and includes a neutral leg 88 directly connected with the low side of the main machine output rectifier 72. In this sense, the first electrical connector 194 can operate to jump, connect, link, or otherwise electrically couple the neutral phase output 88 with the S/G assembly 10 ground, and the second electrical connector 196 can operate to jump the three phase output 86 to the common voltage output 198.

Embodiments of the disclosure can include configurations wherein at least one of the first electrical connector 194 or second electrical connector 196 is a selectively enablable switchable element, such as an electro-mechanical switching element, controllable by the processor 64 or controller module 60, which can toggle, switch, or alternate between a first AC position, resulting in the electrical schematic of FIG. 3, and a second DC position, resulting in the electrical schematic of FIG. 4. In this sense, the first electrical connector 194 can include a selectable or switchable jumper connector having a first neutral position that does not jump, or electrically de-couples, the neutral phase output 88 with the low side of the main machine output rectifier 72 and a second grounding position that does jump the neutral phase output 88 with the low side of the main machine output rectifier 72 or S/G assembly 10 ground. Additionally, in this sense, the second electrical connector 196 can include a first selectable or switchable jumper connector having a first AC position that does not jump, or electrically de-couples, the three output phases 86 and a second DC position that does jump the three output phases 86 to a common voltage output 198. Alternatively, at least one of the first electrical connector 194 or second electrical connector 196 can include a physically accessible, and physically installable or removable jumper connector. In yet another non-limiting example embodiment of the disclosure, the first electrical connector 194 or second electrical connector 196 can include a contactor connection, a solid state switch or switches, bus bars, or the like.

The converter 150 can further be configured to receive a second gate drive signal 190. By way of non-limiting example, the processor 64 or the controller module 60 can be configured to drive, control, or generate the second gate signal 190 for controlling the transistor bridge 80 of the converter 150 to convert the first DC power received at the output of the main machine output rectifier 72 to a second DC power supplied to the second electrical connector 196 or common voltage output 198, with grounding via the first electrical connector 194 and the neutral leg 88. One non-limiting example second DC power can include 270 Volts DC. Non-limiting examples of the second gate signal 190 can include a fixed duty cycle.

Thus, the processor 64 or the controller module 60 can be configured to operate the GCU 36 in an AC operating mode to generate a first gate signal 90 to operate the converter 50 of the first embodiment as a DC to AC converter 50 (or, for example, as an inverter), to provide a four-leg AC voltage output 86, 88. Additionally, the processor 64 or the controller module 60 can be configured to operate the GCU 36 in a DC operating mode to generate a second gate signal 190 to operate the converter 150 of the second embodiment as a DC to DC converter 150 to convert the first DC power to a second DC power, to provide a DC voltage output 198, 88.

Embodiments of the disclosure can therefore include a GCU 36 configurable or selectively operable to provide an AC or a DC voltage output for a generator or S/G assembly 10. In this sense, the embodiments of the disclosure enable a common GCU 36 that can be applied to any number of generator assemblies, and can be configured to operate any of the number of generator assemblies by way of control by the controller module 60 and operation of the transistor bridge 80 and first or second electrical connectors 194, 196 of the converter 50, 150. Additionally, the controller module 60 can enable various output voltages (e.g. AC or DC) at different frequencies, based on the generation of the gate drive signal 90, 190. Embodiments of the disclosure can also be equally applied to include a GCU 36 configurable or selectively operable to provide an AC or DC voltage output for any power-generating device, including, but not limited to, batteries, solar panels, fuel cells, and the like.

Figure 5:
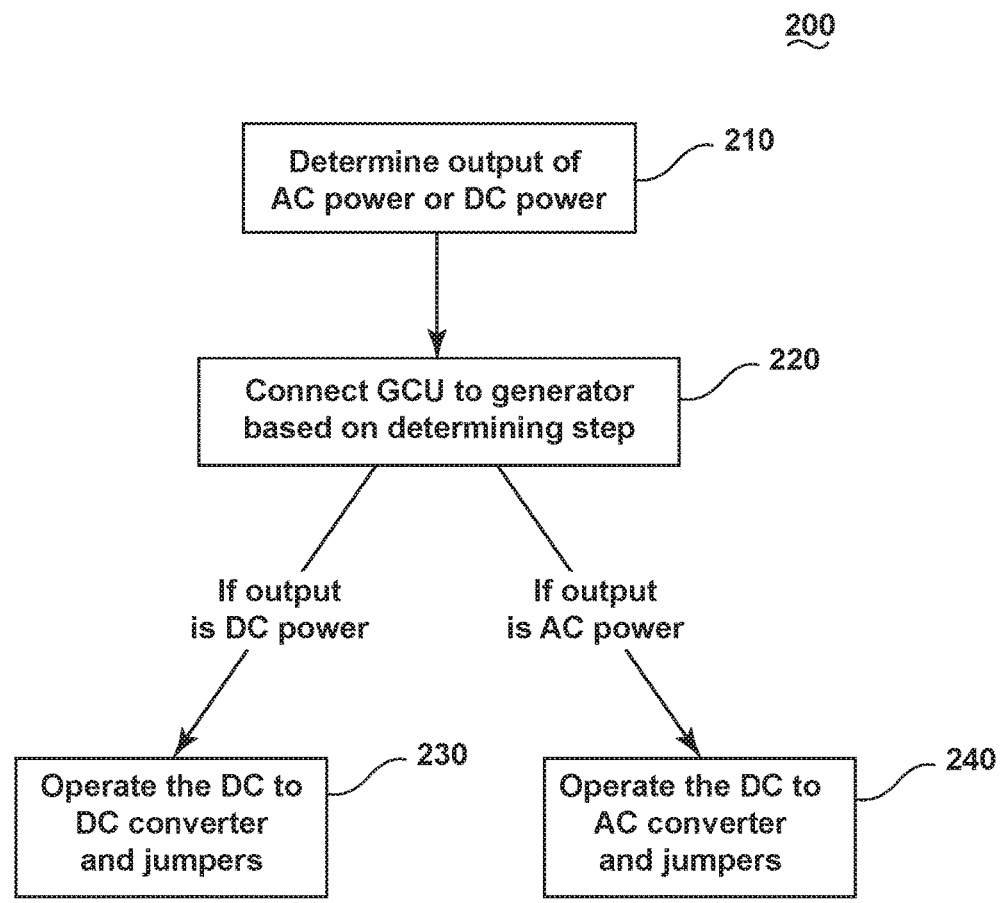
FIG. 5 is an example a flow chart diagram of demonstrating a method of configuring output from a starter/generator, in accordance with various aspects described herein.

FIG. 5 illustrates a flow chart demonstrating a method 200 of configuring output from the S/G assembly 10. The method 200 begins by determining at step 210 whether an output from the S/G assembly 10 is one of AC power or DC power. The determining step 210 can also include determining at least one of a voltage or frequency of the AC power, or voltage of the DC power. The determining step 210 can occur prior to, or during at least one of generator installation, generator configuration, or generator configuration during operation.

Next, the method 200 includes connecting at step 220 the GCU 36 to the generator, for example, by fixedly or removably mounting the GCU 36 to the generator and electrically coupling the transistor bridge 80, and respectively, the three phase outputs 86, the common voltage output 198, or the neutral leg output 88, as needed based on the determining step 210. The controller module 60 can also be selectably configured to operate the converter 50, 150 as a DC to AC power converter or as a DC to DC power converter, also based on the determining step 210.

If the output is DC power, as determined in the determining step 210, the method 200 continues from the connecting step 220 to setting the GCU 36 to operate at step 230 in a DC generation mode by connecting the second electrical connector 196 of the converter 50, 150 to operably jump the three output phases 86 to the common voltage output 198. The operating step 230 can also connect the first electrical connector 194 of the converter 50, 150 to operably jump the neutral leg output 88 with the generator ground. The operating step 230 can further set the controller module 60 or the processor 64 to operate the transistor bridge 80 as a DC to DC power converter, based on the gate drive signal 190. If the determining step 210 includes determining the voltage of the DC power, the operating step 230 can also include converting the power to the determined voltage of the DC power.

If the output is AC power, as determined by the determining step 210, the method continues from the connecting step 220 to setting the GCU 36 to operate at step 240 in an AC generation mode by withholding, removing, preventing, or disconnecting the second electrical connector 196 of the converter 50, 150 to operably prevent the jumping of the three output phases 86. The operating step 240 can also withhold, remove, prevent, or disconnect the first electrical connector 194 of the converter 50, 150 to operably prevent the jumping of the neutral leg output 88 with the generator ground. The operating step 240 can further set the controller module 60 or the processor 64 to operating the transistor bridge 80 as a DC to AC power converter (or inverter), based on the gate drive signal 90. If the determining step 210 includes determining at least one of the voltage or frequency of the AC power, the operating step 240 can also include inverting the power to the determined voltage or frequency of the AC power.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. For example, the method 200 can optionally include rectifying the generator output to DC power prior to the determining step 210. Additionally or alternatively, the method 200 can be completed more than once on a GCU 36, for example, to reconfigure a generator to operate in the opposing generating mode (e.g. run a second method to configure the GCU to operate as a DC to AC power inverter from a DC to DC power converter, or vice versa), or to operate in the same generating mode, but with different power characteristics (e.g. voltage or frequency characteristics). In this sense, the GCU 36 can be reconfigured to repurpose an existing generator.

Many other possible embodiments and configurations in addition to that shown in the above figures are contemplated by the present disclosure. For example, one embodiment of the invention contemplates a GCU 36 configured to provide on a single, or two phases of AC power. In another non-limiting example embodiment of the disclosure, the generator can include a set of windings arranged to generate more or fewer phases of power at the main machine output than illustrated. For example, the generator can generate a single phase of power, two phases of power, six phases of power, etc. In such embodiments of the disclosure, the main machine output rectifier 72 can be arranged to match the number of generated power phases (e.g. a bridge configured to rectify six phase power to DC power, etc.).

In yet another non-limiting embodiment of the disclosure, the three phases of AC power 86 or the neutral leg 88 can be arranged internal to, or external to the GCU 36, or another aforementioned component. In this sense, the first electrical connector 194 or second electrical connector 196 can be arranged internal or external to the GCU 36 or another component. Additionally, the design and placement of the various components such as valves, pumps, or conduits can be rearranged such that a number of different in-line configurations could be realized.

The method disclosed herein provides for and apparatus and method for configuring or operating a GCU to control the output of a generator. The technical effect is that the above described embodiments enable the configuration and operation of a GCU capable of converting the output of a generator to a desired output, such as DC power or AC power. One advantage that can be realized in the above disclosure is that the method and apparatus enables a single GCU embodiment that is configurable to operate an AC generator or a DC generator, or provide either AC power output or DC power output regardless of the generator type, itself. This allows for a common GCU embodiment that can be configured, for example, during installation, to provide a desired power output (AC or DC, including voltage and frequency characteristics), compared with different GCU designs that were provided in conventional generator systems depending on the generator type (AC or DC, for example). Thus, a single GCU embodiment can be configured for a set of generator types, and taken as an "off the shelf" component during installation, with minimal configurations to apply.

Another advantage that can be realized is that by utilizing a common GCU embodiment having the configurable elements, costs to design, qualify, and maintain the GCU is reduced to only a single embodiment. The single solution allows for lower non-reoccurring and reoccurring cost to a customer or manufacturer, as well as lower costs to store fewer specialized parts to stock, allowing a lower cost maintain a fleet of aircraft, vehicles, or generators. Yet another advantage, embodiments of the disclosure provide a common interface to the generator with a common volume envelope having minimal weigh and space impacts. A common interface and common volume enable standardized design considerations when designing the generator embodiments.

The components can be any combination of known synchronous motors and generators. In addition to the accessories shown in this embodiment, there can be other components that can need to be operated for particular applications. For example, in addition to the electromechanical accessories shown, there can be other accessories driven from the same rotatable shaft 18 such as an oil pump, a fluid compressor, or a hydraulic pump. Although the method describes three phases, single phase, a three sequential segment acceleration reaching 60 Hz, other phases, segments, and frequencies are contemplated for use in the initial, accelerating, and steady-state operations.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator control unit comprising:
a four-leg power bridge having an input, three output phases, and a neutral phase output, wherein the input is operably coupled with a generator direct current (DC) power output and the four-leg power bridge includes a first selectively enablable switchable element having an alternating current (AC) position that electrically de-couples the three output phases and a DC position that electrically couples the three output phases; and
a controller communicatively coupled with the four-leg power bridge and configured to operate the four-leg power bridge as at least one of a DC-to-DC power converter or a DC-to-AC power inverter;
wherein the generator control unit is selectably operable in an AC operating mode when the first selectively enablable switchable element is in the AC position and the controller operably controls the four-leg power bridge as a DC-to-AC power inverter, and operable in a DC operating mode when the first selectively enablable switchable element is in the DC position and the controller operably controls the four-leg power bridge as a DC-to-DC power converter.

2. The generator control unit of claim 1, further includes a second selectively enablable switchable element having a neutral position that electrically de-couples the neutral phase output from a generator ground output and a grounding position that electrically couples the neutral phase output with the generator ground output, wherein the generator control unit is selectably operable in an AC operating mode when the second selectively enablable switchable element is in the neutral position, and operable in a DC operating mode when the second selectively enablable switchable element is in the grounding position.

3. The generator control unit of claim 2 wherein at least one of the first selectively enablable switchable element or second selectively enablable switchable element includes an electro-mechanical switching element.

4. The generator control unit of claim 2 wherein at least one of the first selectively enablable switchable element or second selectively enablable switchable element includes a physically removable element.

5. The generator control unit of claim 1 wherein the four-leg power bridge and the controller are configurable to operate a coupled generator in either a DC operating mode to provide DC power at a DC power output, or in an AC operating mode to provide AC power at a set of AC power outputs.

6. The generator control unit of claim 1 wherein the four-leg power bridge is a transistor bridge.

7. The generator control unit of claim 6 wherein the controller is configured to operate the transistor bridge by providing a gate drive signal to the transistor bridge.

8. The generator control unit of claim 7 wherein the gate drive signal comprises at least one of a sine wave modulation profile or a space vector modulation profile when the generator control unit is selectably operable in the AC operating mode.

9. A generator comprising:
a rotatable rotor having a first set of windings;
a stator having a second set of windings electrically coupled with an output, wherein rotation of the first set of windings relative to the second set of windings supplies a direct current power at the output; and
a generator control unit including:
a four-leg power bridge having an input, three output phases, and a neutral phase output, wherein the input is operably coupled with the second set of windings and the four-leg power bridge includes a first selectable connector having an AC position that does not jump the three output phases and a DC position that jumps the three output phases; and
a controller communicatively coupled with the four-leg power bridge and configured to operate the four-leg power bridge as at least one of a DC-to-DC power converter or a DC-to-AC power inverter;
wherein the generator is selectably operable in an AC operating mode when the first selectable connector is in the AC position and the controller operably controls the four-leg power bridge as a DC-to-AC power inverter, and operable in a DC operating mode when the first selectable connector is in the DC position and the controller operably controls the four-leg power bridge as a DC-to-DC power converter.

10. The generator claim 9, wherein the generator control unit further includes a second selectable connector having a neutral position that does not jump the neutral phase output with a generator ground output and a grounding position that jumps the neutral phase output with the generator ground output, wherein the generator control unit is selectably operable in an AC operating mode when the second selectable connector is in the neutral position, and operable in a DC operating mode when the second selectable connector is in the grounding position.

11. The generator of claim 10 wherein at least one of the first selectable connector or second selectable connector includes an electro-mechanical switching element.

12. The generator of claim 10 wherein at least one of the first selectable connector or second selectable connector includes a physically removable connector.

13. A method of configuring output from a generator, comprising:
determining output from a generator as one of alternating current (AC) power or direct current (DC) power;
connecting a generator control unit to the generator, the generator control unit having a four-leg power bridge including three output phases and a neutral phase output, and a controller module configured to operate the four-leg power bridge as a DC-to-AC power inverter or as a DC-to-DC-power converter; wherein
in response to determining the output from the generator as DC power, setting the generator control unit to operate in a DC generating mode by connecting a first jumper connector to the four-leg power bridge in a DC position that operably jumps the three output phases, and setting the controller module to operate the four-leg power bridge as a DC-to-DC power converter; and
in response to determining the output from the generator as AC power, setting the generator control unit to operate in an AC generating mode by withholding the first jumper connector from the four-leg power bridge in an AC position that does not operably jump the three output phases, and setting the controller module to operate the four-leg power bridge as a DC-to-AC power inverter.

14. The method of claim 13, wherein the determining includes determining at least one of a voltage or frequency of the AC power or voltage of the DC power.

15. The method of claim 14, wherein if the output is to be AC power, setting the generator control unit to operate the four-leg power bridge as a DC-to-AC power inverter configured to invert the power to the determined voltage and frequency of the AC power.

16. The method of claim 14, wherein if the output is to be DC power, setting the generator control unit to operate the four-leg power bridge as a DC-to-DC power converter configured to convert the power to the determined voltage of the DC power.

17. The method of claim 13 further comprising rectifying the generator output to DC power prior to operating the four-leg power bridge as the DC-to-AC power inverter or as the DC-to-DC-power converter.

18. The method of claim 13 wherein the determining includes determining output from the generator during at least one of generator installation or configuration.

19. The method of claim 13 wherein if the output is to be DC, setting the generator control unit to operate in the DC generating mode by connecting a second jumper connected to the four-leg power bridge in a DC position that operably jumps the neutral phase output to a generator ground.

20. The method of claim 19 wherein if the output is to be AC, setting the generator control unit to operate in the AC generating mode by withholding the second jumper connector from the four-leg power bridge in an AC position that does not operably jump the neutral phase output to the generator ground.

\* \* \* \* \*